US011623167B2

(12) United States Patent
Lopez

(10) Patent No.: US 11,623,167 B2
(45) Date of Patent: Apr. 11, 2023

(54) FILTER INSERT AND SAMPLE VIAL USING THE SAME

(71) Applicant: REACTION ANALYTICS, INC., Wilmington, DE (US)

(72) Inventor: Michael Antonio Lopez, Wilmington, DE (US)

(73) Assignee: Reaction Analytics Inc., Wilmington, DE (US)

( * ) Notice: Subject to any disclaimer, the term of this patent is extended or adjusted under 35 U.S.C. 154(b) by 694 days.

(21) Appl. No.: 16/466,969

(22) PCT Filed: Dec. 7, 2017

(86) PCT No.: PCT/US2017/065100
§ 371 (c)(1),
(2) Date: Jun. 5, 2019

(87) PCT Pub. No.: WO2018/106909
PCT Pub. Date: Jun. 14, 2018

(65) Prior Publication Data
US 2019/0336891 A1    Nov. 7, 2019

Related U.S. Application Data

(60) Provisional application No. 62/431,737, filed on Dec. 8, 2016.

(51) Int. Cl.
*B01D 29/05* (2006.01)
*B01L 3/00* (2006.01)
*G01N 1/40* (2006.01)

(52) U.S. Cl.
CPC ............ *B01D 29/055* (2013.01); *B01L 3/502* (2013.01); *B01L 3/5082* (2013.01);
(Continued)

(58) Field of Classification Search
CPC ........ B01D 29/055; B01D 2201/4084; B01D 2201/4092; B01D 2201/602;
(Continued)

(56) References Cited

U.S. PATENT DOCUMENTS

| 4,963,256 A | 10/1990 | Nelson |
| 5,556,541 A * | 9/1996 | Ruschke ............ B01D 29/05 264/DIG. 48 |

(Continued)

FOREIGN PATENT DOCUMENTS

| JP | 2001509590 A | 7/2001 |
| JP | 2003329688 A | 11/2003 |

(Continued)

OTHER PUBLICATIONS

"Hawley's Condensed Chemical Dictionary," Twelfth Edition, published by Van Nostrand Reinhold, Library of Congress Catalog Card No. 92-18951 ISBN 0-442-01131-8, 1993, 3 pages.
(Continued)

*Primary Examiner* — Benjamin R Whatley
*Assistant Examiner* — Jacqueline Brazin
(74) *Attorney, Agent, or Firm* — Blank Rome LLP

(57) ABSTRACT

A filter insert, a sample vial incorporating a filter insert, a method of using a sample vial containing a filter insert for chemical analysis, and a sample vial kit including a filter insert. The filter insert includes a cylindrical body having a proximal end, a protrusion extending radially from the proximal end of the cylindrical body and configured to set on the open end of a sample vial, a distal end, a cavity extending longitudinally through the cylindrical body from the proximal end to the distal end, and a filter assembly coupled with the distal end of the cylindrical body.

20 Claims, 13 Drawing Sheets

(52) U.S. Cl.
CPC ... *G01N 1/4077* (2013.01); *B01D 2201/4084* (2013.01); *B01D 2201/4092* (2013.01); *B01D 2201/602* (2013.01); *B01D 2239/0421* (2013.01); *B01D 2239/0428* (2013.01); *B01L 2300/0681* (2013.01); *G01N 2001/4088* (2013.01)

(58) Field of Classification Search
CPC .... B01D 2239/0421; B01D 2239/0428; B01D 2239/0613; B01L 3/502; B01L 3/5082; B01L 2300/0681; B01L 2300/044; G01N 1/4077; G01N 2001/4088
USPC .......................................................... 422/534
See application file for complete search history.

(56) References Cited

U.S. PATENT DOCUMENTS

| | | | |
|---|---|---|---|
| 6,506,167 B1 | 1/2003 | Ishimito et al. | |
| 7,598,076 B2* | 10/2009 | Wedell | B01L 3/508 |
| | | | 435/297.5 |
| 8,206,648 B2 | 6/2012 | Sattler | |
| 2002/0096467 A1* | 7/2002 | Cappia | B01D 69/12 |
| | | | 210/321.6 |
| 2003/0013205 A1* | 1/2003 | Konrad | B01L 3/563 |
| | | | 436/178 |
| 2004/0157245 A1 | 8/2004 | Radmacher et al. | |
| 2006/0037903 A1 | 2/2006 | Smith et al. | |
| 2010/0298752 A1* | 11/2010 | Briggs | A61M 1/3683 |
| | | | 604/6.01 |
| 2013/0270173 A1* | 10/2013 | Tortorella | B01L 3/00 |
| | | | 210/416.1 |

FOREIGN PATENT DOCUMENTS

| | | |
|---|---|---|
| JP | 2005074234 A | 3/2005 |
| JP | 2005283356 A | 10/2005 |
| JP | 2008096165 A | 4/2008 |
| JP | 2011099769 A | 5/2011 |
| JP | 2011185737 A | 9/2011 |
| JP | 2011239574 A | 11/2011 |
| JP | 2013181989 A | 9/2013 |
| WO | 2014064921 A1 | 9/2016 |

OTHER PUBLICATIONS

Int'l ISRWO issued in copending PCT Application No. PCT/US2017/065100 dated Feb. 6, 2018, 13 pages.

* cited by examiner

FILTER INSERT AND SAMPLE VIAL USING THE SAME

CROSS REFERENCE TO RELATED APPLICATIONS

This application is a national stage of International Patent Application No. PCT/US2017/065100, filed Dec. 7, 2017, which claims the benefit of U.S. Provisional Application No. 62/431,737, filed Dec. 8, 2016, each of which are hereby incorporated by reference in their entirety.

TECHNICAL FIELD

The present invention relates to vials for the storage and dispensation of chemical or biological samples for analysis. More specifically, the present invention relates to filter inserts for use in sample vials.

BACKGROUND

Many recent advances in the medical, life and environmental sciences have relied on precise chemical analysis of liquid samples comprising many constituent components. Typically, samples are placed in small glass or plastic vials having capacities ranging from several microliters to several milliliters. To provide high throughput, analytical chemical techniques can be automated. While as many as hundreds of samples can be prepared and loaded for automated analysis, the analysis of such samples can take hours or days to complete. Thus, samples are held in vials for hours or days before analysis actually takes place.

Typically, a sample to be analyzed is dissolved in a solvent or solvent system to form a sample solution. The sample solution is then placed in a vial which is subsequently sealed at its top by a septum, which is in turn held in place by a vial cap. The purpose of the septum is to protect the sample solution in the vial from evaporative loss, spillage, and contamination, while providing convenient access with a syringe. The syringe can be used to remove a precise amount of the sample solution from the vial. Typically, the syringe needle pierces the septum, the desired aliquot of sample solution is withdrawn, and the needle is withdrawn from the septum. The aliquot of sample solution in the syringe can then be injected into an analytical system, such as a gas chromatograph, which may have its own septum.

Also, for accurate analysis by the analytical system, and to prevent contamination, clogging or other compromisation of the analytical system due to the presence of solids, the sample in the vial must generally be fully dissolved or solubilized in the solvent prior to injection of the sample into the analytical system. In certain instances, solid samples, which are poorly soluble and/or require an external stressor such as heat, stirring or irradiation, may not be suitable for short-timeframe automated analysis. Alternatively the analysis of such solid samples requires costly and time-intensive experimentation.

BRIEF DESCRIPTION OF THE DRAWINGS

The following drawings illustrate certain aspects of some embodiments and should not be used to limit or define the subject matter of the present disclosure.

DETAILED DESCRIPTION

Figure 1:
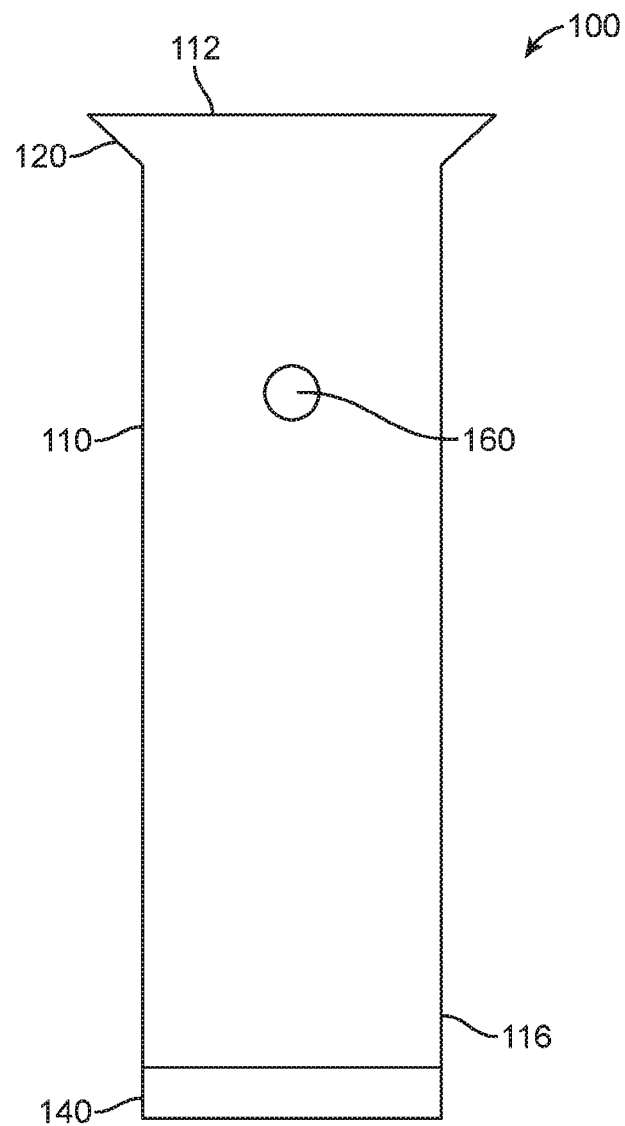
FIG. 1 is a side plan view of a sample vial filter insert in accordance with various embodiments of the present disclosure.

The following description of the embodiments are merely exemplary in nature and are in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1 millimeter (mm) can be construed to be a range from 0.9 mm to 1.1 mm. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

For the purposes of this specification and appended claims, the term "coupled" refers to the linking or connection of two objects. The coupling can be permanent or reversible. The coupling can be direct or indirect. An indirect coupling includes connecting two objects through one or more intermediary objects. The term "substantially" refers to an element essentially conforming to the particular dimension, shape or other word that substantially modifies, such that the component need not be exact. For example, substantially circular means that the object resembles a circle, but can have one or more deviations from a true circle.

Figure 2:
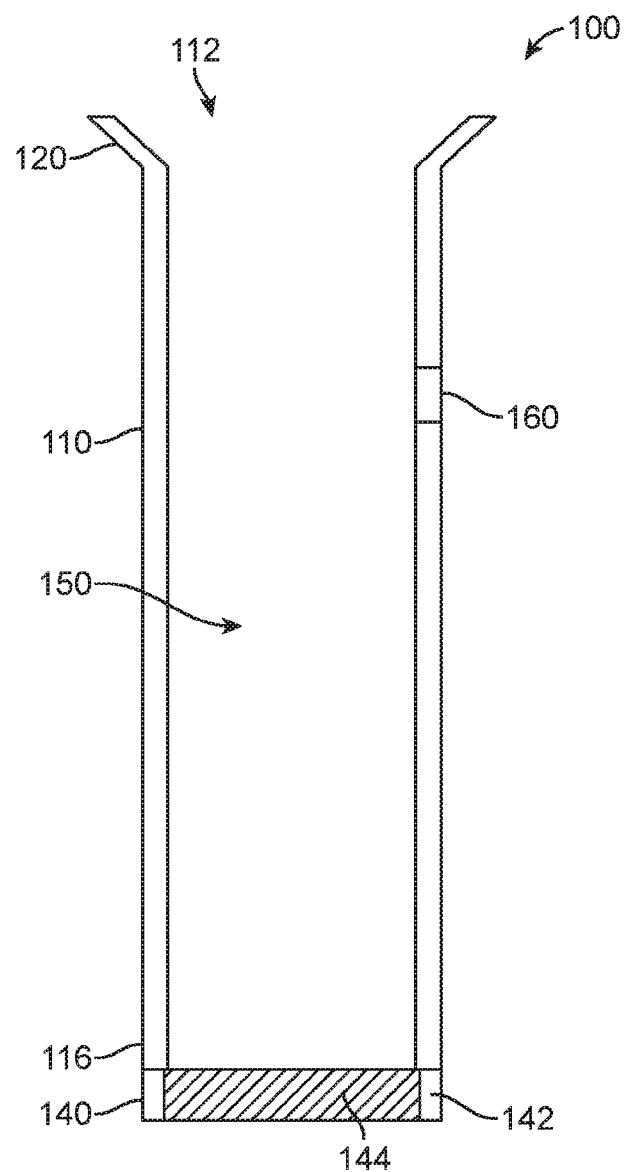
FIG. 2 is a cross-sectional view of the filter insert of FIG. 1 in accordance with various embodiments of the present disclosure.

FIG. 1 is a side plan view of a sample vial filter insert in accordance with various embodiments of the present disclosure. FIG. 2 is a cross-sectional view of the filter insert of FIG. 1 in accordance with various embodiments of the present disclosure. The filter insert 100 includes a cylindrical body 110 and a filter assembly 140. The cylindrical body 110 includes a proximal open end 112, a distal end 116, a protrusion or tapered lip 120 extending radially from the proximal end 112 of the cylindrical body 110. The lip 120 is configured to set on an open end of a sample vial. The filter assembly 140 is coupled with the distal end 116 of the cylindrical body 110. A cavity 150 extends longitudinally through the cylindrical body 110, from the proximal end 112 to the distal end 116. A throughput 160 allows for fluid communication between the cavity 150 and the environment external to the filter insert 100. The filter assembly 140 includes a ring 142 and a filter material 144. In some instances, the ring 142 can be coupled with the distal end 116 of the cylindrical body 110 by a reversible coupling, such as, for example, in embodiments illustrated in FIGS. 5-9. In other instances, the ring 142 can be permanently coupled with the distal end 116 of the cylindrical body 110 by fusing or melting the ring 142 to the distal end 116 of the cylindrical body 110. In yet other instances, the ring 142 can be coupled with the distal end 116 of the cylindrical body 110 using an adhesive or glue which is substantially stable in a wide range of chemical environments, temperatures, and pressures.

In some instances, the filter material 144 can be a woven or mesh-like material. In some instances, the filter material 144 can be a nonwoven material comprising a plurality or regularly oriented or irregularly oriented fibers. In some instances, the filter material 144 can be a porous material or polymeric membrane comprising pores, wherein each pore has substantially the same diameter. In some instances, the filter material 144 can be a porous material or polymeric membrane comprising a range of pore diameters. When the filter material 144 is a porous material or polymeric membrane, the pores can range from about 5 nanometers (nm) to about 100 micrometers (μm) in diameter, alternatively from about 100 nm to about 50 μm, alternatively from about 250 nm to about 20 μm, alternatively from about 500 nm to about 10 μm, and alternatively about 1 μm to about 5 μm in diameter. In some instances, the filter material 144 can be made of a hydrophobic or hydrophilic material or can be coated with a hydrophobic or hydrophilic material for selective filtering. For example, in instances where a compound or composition of analytical interest is hydrophobic in nature, a hydrophobic filter material can be used to allow the hydrophobic compound to traverse the filter material 144 while preventing the flow of hydrophilic compounds therethrough. The filter material 144 can be chosen or modified based on the type of chemical environment or composition to be analyzed.

In some instances, the cylindrical body 110, the ring 142 and the filter material 144 of the filter assembly 140 can be made of the same material. In other instances, the cylindrical body 110 and the ring 142 can be made of the same material while the filter material 144 is made of a different material. In other instances, the cylindrical body can be a made of a first material while the ring 142 and filter material 144 are made of a second material. In yet other instances, the cylindrical body 110, the ring 142 and the filter material 144 can all be made of different materials.

In some instances one or more of the cylindrical body 110, the ring 142 and the filter material 144 can be made of a polymeric material. The polymeric material can be any one of a poly(alkylene oxide) (such as, for example, poly(ethylene oxide), poly(propylene oxide) or poly(butylene oxide)), a poly(ethylene terephthalate), a polyamine, a polyamide, a polyimide, a poly(alkylacrylamide), a polycarbonate (PC), a polyacrylate, a poly(methyl methacrylate), a polyvinyl alcohol (PVOH), a polyvinyl acetate (PVAc), a polyvinyl chloride (PVC), a high-density polyalkylene, a low-density polyalkylene, a poly-aramid, a polyacrylonitrile (PAN), an aromatic polyester, a polyketone, a polyaryl ether ketone (PAEK), a polyether ether ketone (PEEK), a polyether ketone (PEKK), a polyaromatic, a polysulfone, and a polyetherimide (PEI).

In other instances, one or more of the cylindrical body 110, the ring 142 and the filter material 144 can be made of a fluorinated polymeric material. The fluorinated polymeric material can be any one of a polytetrafluoroethylene, a polychlorotrifluoroethylene, a polyethylenechlorotrifluoroethylene, a polyvinylfluoride, a polyvinylidene fluoride, a perfluoroalkoxy polymer, a fluorinated ethylene-propylene polymer, a polyethylenetetrafluoroethylene, a perfluorinated elastomer, a fluoroelastomer (such as, for example, tetrafluoroethylene-propylene), a perfluoropolyether, and a perfluorosulfonic acid polymer.

In some instances, the filter material 144 can comprise a carbon-based filtering material such as, for example, carbon nanosheets, carbon fibers, single- or multi-walled carbon nanotubes, activated carbon, charcoal, and bone char.

In some instances, the filter material 144 can comprise a silicon-based filtering material such as, for example, a polysiloxane, silicon dioxide, fumed silica, silica gel, an aerogel, an aluminosilicate, an alkaline earth aluminosilicate, a fluorosilicate, or a fluoroborosilicate. In some instances, the filter material 144 can comprise a porous metal oxide such as aluminum oxide or titanium oxide.

Figure 3:
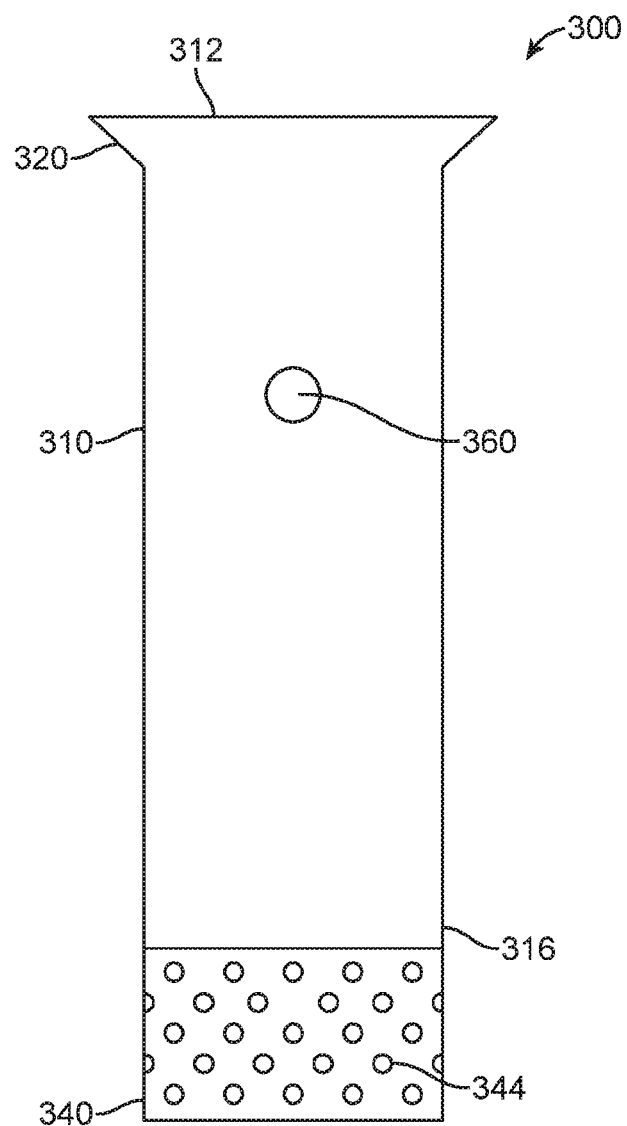
FIG. 3 is a side plan view of another filter insert in accordance with various embodiments of the present disclosure.

FIG. 3 is a side plan view of another sample vial filter insert in accordance with various embodiments of the present disclosure. The filter insert 300 includes a cylindrical body 310 and a filter assembly 340. The cylindrical body 310 includes a proximal open end 312, a distal end 316, a protrusion or tapered lip 320 extending radially from the proximal end 312 of the cylindrical body 310. The lip 320 is configured to set on an open end of a sample vial. The filter assembly 340 is coupled with the distal end 316 of the cylindrical body 310. A cavity (not shown) extends longitudinally through the cylindrical body 310, from the proximal end 312 to the distal end 316. A throughput 360 allows for fluid communication between the cavity and the environment external to the filter insert 300.

The filter assembly 140 illustrated in FIGS. 1-2 can be described as having a solid ring 142 and a disc or wafer-shaped filter material 144. In the filter insert 100, a sample-containing solution can traverse the filter material 144 at the bottom of the filter insert 100 where the filter material 144 is located. The filter assembly 340 includes a plurality of pores 344 and, by comparison, has a longitudinal dimension, or height, which is greater than the same of the filter assembly 140. Also, the filter assembly 340, by comparison, can have pores 344 on the sidewall and the bottom of the filter assembly 340. Therefore, the filter assembly 340 can contain a larger surface area through which a sample-containing solution can traverse and enter the cavity of the filter insert 300 as compared to the filter insert 100. In some instances, the bottom of the filter assembly 340 can be non-porous. In some instances, the filter assembly 340 has a substantially uniform physical structure throughout. In some instances, the filter assembly 340 has a porous bottom, a porous sidewall and a cavity (not shown) extending from the porous bottom to the cavity of the cylindrical body 310. In some instances, the filter assembly 340 has a non-porous bottom, a porous sidewall and a cavity (not shown) extending from the non-porous bottom to the cavity of the cylindrical body 310.

In some instances, the filter assembly 340 can be coupled with the distal end 316 of the cylindrical body 310 by a reversible coupling, such as, for example, in embodiments illustrated in FIGS. 5-9. In other instances, the filter assembly 340 can be permanently coupled with the distal end 316 of the cylindrical body 310 by fusing or melting the filter assembly 340 to the distal end 316 of the cylindrical body 310. In yet other instances, the filter assembly 340 can be coupled with the distal end 316 of the cylindrical body 310 using an adhesive or glue which is substantially stable in a wide range of chemical environments, temperatures, and pressures.

In some instances, the filter assembly 340 can comprise pores 344 wherein each pore 344 has substantially the same diameter. In some instances, the filter assembly 340 can comprise pores 344 having a range of pore diameters. Each of the pores 344 can have a diameter ranging from about 5 nanometers (nm) to about 100 micrometers (μm) in diameter, alternatively from about 100 nm to about 50 μm, alternatively from about 250 nm to about 20 μm, alternatively from about 500 nm to about 10 μm, and alternatively about 1 μm to about 5 μm in diameter.

In some instances, the filter assembly 340 can be made of a woven or mesh-like material. In some instances, the filter assembly 340 can be made of a nonwoven material comprising a plurality or regularly oriented and/or irregularly oriented fibers. In some instances, the filter assembly 340 can be made of a hydrophobic or hydrophilic material or can be coated with a hydrophobic or hydrophilic material for selective filtering. For example, in instances where a compound or composition of analytical interest is hydrophobic in nature, a hydrophobic filter assembly can be used to allow the hydrophobic compound to traverse the filter assembly 340 while preventing the flow of hydrophilic compounds therethrough. The filter assembly 340 can be chosen based on the type of chemical environment or composition to be analyzed.

In some instances, the cylindrical body 310 and the filter assembly 340 can be made of the same material. In other instances, the cylindrical body 310 and the filter assembly 340 are made of a different material.

In some instances one or both of the cylindrical body 310 and the filter assembly 340 can be made of a polymeric material. The polymeric material can be any one of a poly(alkylene oxide) (such as, for example, poly(ethylene oxide), poly(propylene oxide) or poly(butylene oxide)), a poly(ethylene terephthalate), a polyamine, a polyamide, a polyimide, a poly(alkylacrylamide), a polycarbonate (PC), a polyacrylate, a poly(methyl methacrylate), a polyvinyl alcohol (PVOH), a polyvinyl acetate (PVAc), a polyvinyl chloride (PVC), a high-density polyalkylene, a low-density polyalkylene, a poly-aramid, a polyacrylonitrile (PAN), an aromatic polyester, a polyketone, a polyaryl ether ketone (PAEK), a polyether ether ketone (PEEK), a polyether ketone (PEKK), a polyaromatic, a polysulfone, and a polyetherimide (PEI).

In other instances, one or both of the cylindrical body 310 and the filter assembly 340 can be made of a fluorinated polymeric material. The fluorinated polymeric material can be any one of a polytetrafluoroethylene, a polychlorotrifluoroethylene, a polyethylenechlorotrifluoroethylene, a polyvinylfluoride, a polyvinylidene fluoride, a perfluoroalkoxy polymer, a fluorinated ethylene-propylene polymer, a polyethylenetetrafluoroethylene, a perfluorinated elastomer, a fluoroelastomer (such as, for example, tetrafluoroethylene-propylene), a perfluoropolyether, and a perfluorosulfonic acid polymer.

In some instances, the filter assembly 340 can comprise a carbon-based filtering material such as, for example, carbon nanosheets, carbon fibers, single- or multiwalled carbon nanotubes, activated carbon, charcoal, and bone char.

In some instances, the filter assembly 340 can comprise a silicon-based filtering material such as, for example, a polysiloxane, silicon dioxide, fumed silica, silica gel, an aerogel, an aluminosilicate, an alkaline earth aluminosilicate, a fluorosilicate, or a fluoroborosilicate. In some instances, the filter assembly 340 can comprise a porous metal oxide such as aluminum oxide or titanium oxide.

Figure 4:
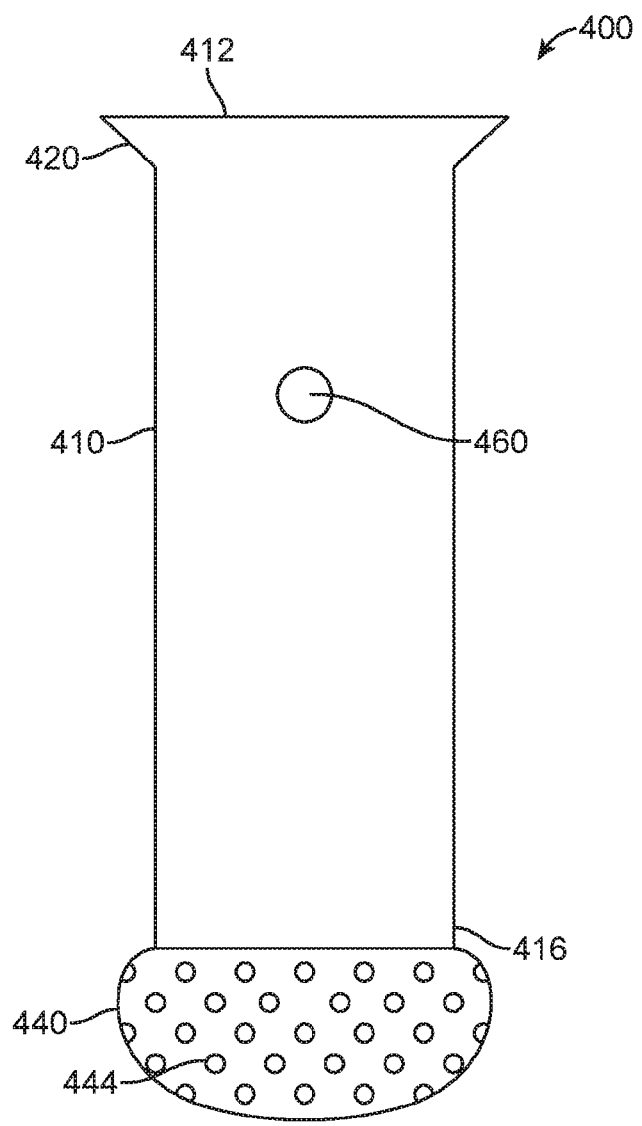
FIG. 4 is a side plan view of yet another filter insert in accordance with various embodiments of the present disclosure.

FIG. 4 is a side plan view of yet another sample vial filter insert in accordance with various embodiments of the present disclosure. The filter insert 400 includes a cylindrical body 410 and a substantially spherical or ovoid filter assembly 440. The cylindrical body 410 includes a proximal open end 412, a distal end 416, a protrusion or tapered lip 420 extending radially from the proximal end 412 of the cylindrical body 410. The lip 420 is configured to set on an open end of a sample vial. The filter assembly 440 is coupled with the distal end 416 of the cylindrical body 410. A cavity (not shown) extends longitudinally through the cylindrical body 410, from the proximal end 412 to the distal end 416. A throughput 460 allows for fluid communication between the cavity and the environment external to the filter insert 400. The filter assembly 440 includes a plurality of pores 444. In some instances, the filter assembly 440 has a substantially uniform physical structure throughout. In some instances, the filter assembly 440 has a substantially spherical or ovoid porous outer wall and a cavity (not shown) extending from the porous outer wall to the cavity of the cylindrical body 410.

In some instances, the filter assembly 440 can be coupled with the distal end 416 of the cylindrical body 410 by a reversible coupling, such as, for example, in embodiments illustrated in FIGS. 5-9. In other instances, the filter assembly 440 can be permanently coupled with the distal end 416 of the cylindrical body 410 by fusing or melting the filter assembly 440 to the distal end 416 of the cylindrical body 410. In yet other instances, the filter assembly 440 can be coupled with the distal end 416 of the cylindrical body 410 using an adhesive or glue which is substantially stable in a wide range of chemical environments, temperatures, and pressures.

In some instances, the filter assembly 440 can comprise pores 444 wherein each pore 444 has substantially the same diameter. In some instances, the filter assembly 440 can comprise pores 444 having a range of pore diameters. Each of the pores 444 can have a diameter ranging from about 5 nanometers (nm) to about 100 micrometers (μm) in diameter, alternatively from about 100 nm to about 50 μm, alternatively from about 250 nm to about 20 μm, alternatively from about 500 nm to about 10 μm, and alternatively about 1 μm to about 5 μm in diameter.

In some instances, the filter assembly 440 can be made of a woven or mesh-like material. In some instances, the filter assembly 440 can be made of a nonwoven material comprising a plurality or regularly oriented and/or irregularly oriented fibers. In some instances, the filter assembly 440 can be made of a hydrophobic or hydrophilic material or can be coated with a hydrophobic or hydrophilic material for selective filtering. For example, in instances where a compound or composition of analytical interest is hydrophobic in nature, a hydrophobic filter assembly can be used to allow the hydrophobic compound to traverse the filter assembly 440 while preventing the flow of hydrophilic compounds therethrough. The filter assembly 440 can be chosen based on the type of chemical environment or composition to be analyzed.

In some instances, the cylindrical body 410 and the filter assembly 440 can be made of the same material. In other instances, the cylindrical body 410 and the filter assembly 440 are made of a different material.

In some instances one or both of the cylindrical body 410 and the filter assembly 440 can be made of a polymeric material. The polymeric material can be any one of a poly(alkylene oxide) (such as, for example, poly(ethylene oxide), poly(propylene oxide) or poly(butylene oxide)), a poly(ethylene terephthalate), a polyamine, a polyamide, a polyimide, a poly(alkylacrylamide), a polycarbonate (PC), a polyacrylate, a poly(methyl methacrylate), a polyvinyl alcohol (PVOH), a polyvinyl acetate (PVAc), a polyvinyl chloride (PVC), a high-density polyalkylene, a low-density polyalkylene, a poly-aramid, a polyacrylonitrile (PAN), an aromatic polyester, a polyketone, a polyaryl ether ketone (PAEK), a polyether ether ketone (PEEK), a polyether ketone (PEKK), a polyaromatic, a polysulfone, and a polyetherimide (PEI).

In other instances, one or both of the cylindrical body 410 and the filter assembly 440 can be made of a fluorinated polymeric material. The fluorinated polymeric material can be any one of a polytetrafluoroethylene, a polychlorotrifluoroethylene, a polyethylenechlorotrifluoroethylene, a polyvinylfluoride, a polyvinylidene fluoride, a perfluoroalkoxy polymer, a fluorinated ethylene-propylene polymer, a polyethylenetetrafluoroethylene, a perfluorinated elastomer, a fluoroelastomer (such as, for example, tetrafluoroethylene-propylene), a perfluoropolyether, and a perfluorosulfonic acid polymer.

In some instances, the filter assembly 440 can comprise a carbon-based filtering material such as, for example, carbon nanosheets, carbon fibers, single- or multiwalled carbon nanotubes, activated carbon, charcoal, and bone char.

In some instances, the filter assembly 440 can comprise a silicon-based filtering material such as, for example, a polysiloxane, silicon dioxide, fumed silica, silica gel, an aerogel, an aluminosilicate, an alkaline earth aluminosilicate, a fluorosilicate, or a fluoroborosilicate. In some instances, the filter assembly 440 can comprise a porous metal oxide such as aluminum oxide or titanium oxide.

Figure 5:
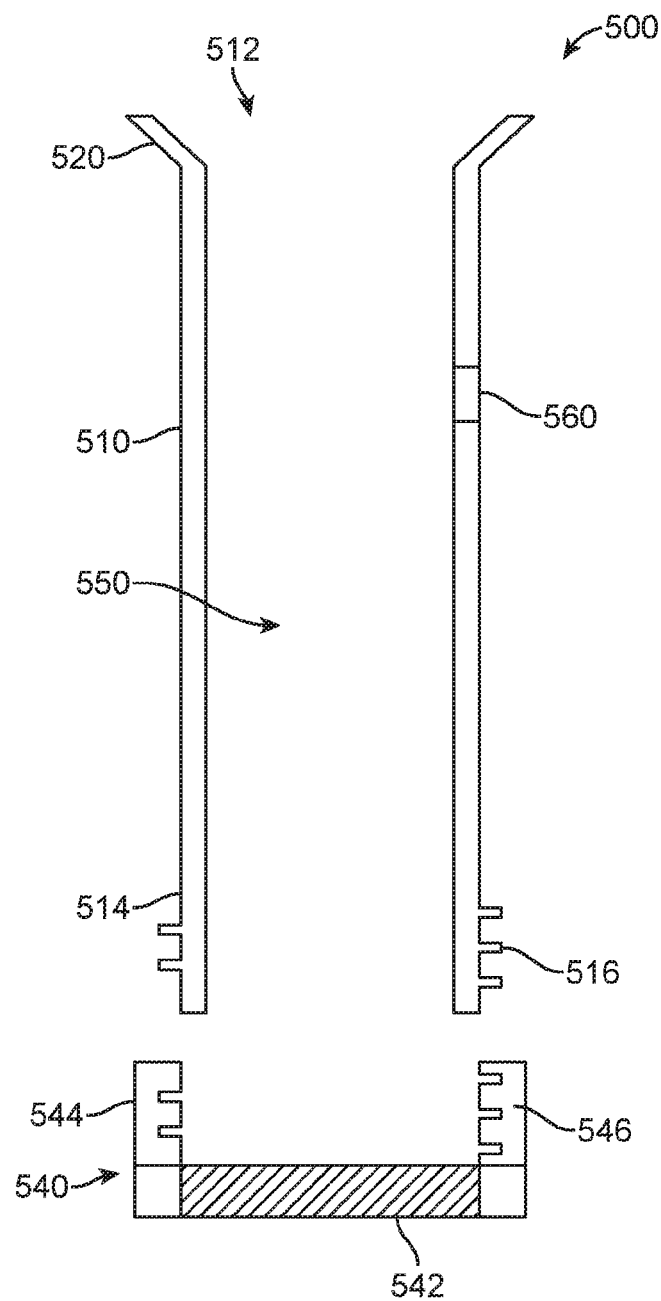
FIG. 5 is an exploded cross-sectional view of yet another filter insert in accordance with various embodiments of the present disclosure.

FIG. 5 is an exploded cross-sectional view of yet another sample vial filter insert in accordance with various embodiments of the present disclosure. The filter insert 500 includes a cylindrical body 510 and a filter assembly 540. The cylindrical body 510 includes a proximal open end 512, a distal open end 514 having male threads 516 extending radially from the distal end 514, and a protrusion or tapered lip 520 extending radially from the proximal end 512 of the cylindrical body 510. The lip 520 is configured to set on an open end of a sample vial. A cavity 550 extends longitudinally through the cylindrical body 510, from the proximal end 512 to the distal end 514. A throughput 560 allows for fluid communication between the cavity 550 and the environment external to the filter insert 500. The filter assembly 540 comprises a cylindrical ring 544 having female threads 546 and a filter material 542. The filter assembly 540 is couplable with the distal end 514 of the cylindrical body 510 via threaded engagement of the male threads 516 and the female threads 546.

In some instances, the cylindrical body 510, the ring 544 and the filter material 542 can be made of the same material. In other instances, the cylindrical body 510 and the ring 544 can be made of the same material while the filter material 542 is made of a different material. In other instances the cylindrical body 510 can be a made of a first material while the ring 544 and filter material 542 are made of a second material. In yet other instances, the cylindrical body 510, the ring 544 and the filter material 542 can all be made of different materials. The materials from which the cylindrical body 510, the ring 544 and the filter material 542 can be made as described with regard to the cylindrical body 110, the ring 142 and the filter material 144.

Figure 6:
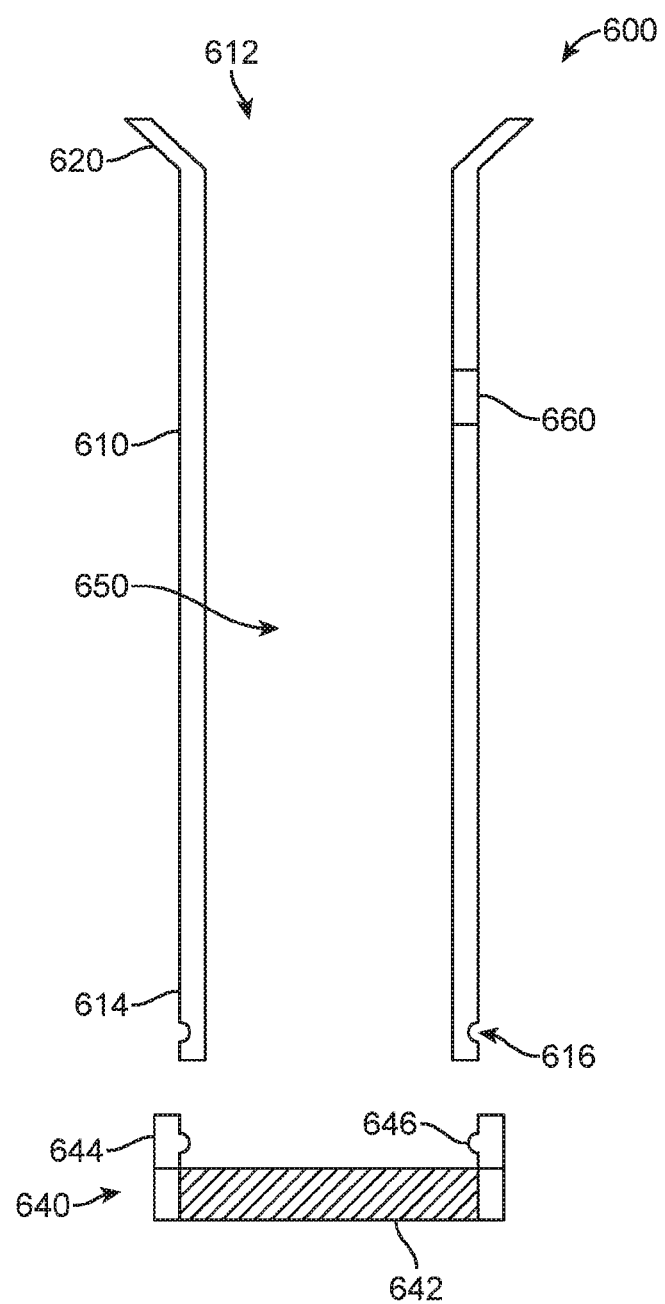
FIG. 6 is an exploded cross-sectional view of yet another filter insert in accordance with various embodiments of the present disclosure.

FIG. 6 is an exploded cross-sectional view of yet another sample vial filter insert in accordance with various embodiments of the present disclosure. The filter insert 600 includes a cylindrical body 610 and a filter assembly 640. The cylindrical body 610 includes a proximal open end 612, a distal open end 614 having a recess 616 about all or a portion of the distal end 614 circumference, and a protrusion or tapered lip 620 extending radially from the proximal end 612 of the cylindrical body 610. The lip 620 is configured to set on an open end of a sample vial. A cavity 650 extends longitudinally through the cylindrical body 610, from the proximal end 612 to the distal end 614. A throughput 660 allows for fluid communication between the cavity 650 and the environment external to the filter insert 600. The filter assembly 640 comprises a cylindrical ring 644 having a protrusion 646 about all or a portion of the inner surface of the cylindrical ring 644, and a filter material 642. The dimensions of the protrusion 646 are the same as, or substantially the same as, recess 616. The filter assembly 640 is couplable with the distal end 614 of the cylindrical body 610 via a snap-fit engagement of the protrusion 646 and the recess 616.

In some instances, the cylindrical body 610, the ring 644 and the filter material 642 can be made of the same material. In other instances, the cylindrical body 610 and the ring 644 can be made of the same material while the filter material 642 is made of a different material. In other instances, the cylindrical body 610 can be a made of a first material while the ring 644 and filter material 642 are made of a second material. In yet other instances, the cylindrical body 610, the ring 644 and the filter material 642 can all be made of different materials. The materials from which the cylindrical body 610, the ring 644 and the filter material 642 can be made as described with regard to the cylindrical body 110, the ring 142 and the filter material 144.

Figure 7:
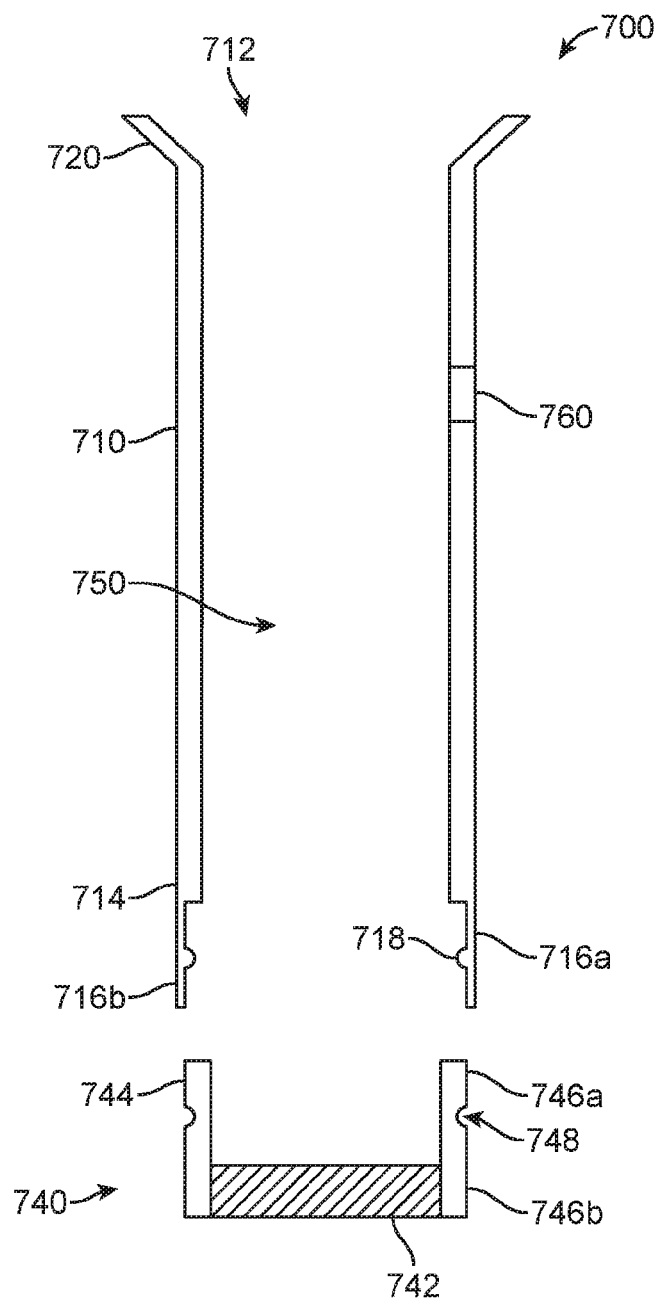
FIG. 7 is an exploded cross-sectional view of yet another filter insert in accordance with various embodiments of the present disclosure.

FIG. 7 is an exploded cross-sectional view of yet another sample vial filter insert in accordance with various embodiments of the present disclosure. The filter insert 700 includes a cylindrical body 710 and a filter assembly 740. The cylindrical body 710 includes a proximal open end 712, a distal open end 714, and a protrusion or tapered lip 720 extending radially from the proximal end 712 of the cylindrical body 710. The lip 720 is configured to set on an open end of a sample vial. The distal end 714 includes recesses 716a, 716b and a protrusion 718 about all or a portion of the interior surface of the distal end 714. A cavity 750 extends longitudinally through the cylindrical body 710, from the proximal end 712 to the distal end 714. A throughput 760 allows for fluid communication between the cavity 750 and the environment external to the filter insert 700. The filter assembly 740 comprises a cylindrical ring 744 having protrusions 746a, 746b and a recess 748 about all or a portion of the outer surface of the cylindrical ring 744, and a filter material 742. The dimensions of the protrusion 718 are the same as, or substantially the same as, recess 748 and the dimensions of the recess 716a are the same as, or substantially the same as, the recess 746a. The inner diameter of the recess 716b is the same as, or substantially the same as, the outer diameter of the protrusion 746b while a longitudinal dimension, or height, of the protrusion 746b can be the same as, greater than, or less than a longitudinal dimension, or height, of the protrusion 716b. The filter assembly 740 is couplable with the distal end 714 of the cylindrical body 710 via a snap-fit engagement of the protrusion 718 and the recess 748.

In some instances, the cylindrical body 710, the ring 744 and the filter material 742 can be made of the same material. In other instances, the cylindrical body 710 and the ring 744 can be made of the same material while the filter material 742 is made of a different material. In other instances, the cylindrical body 710 can be a made of a first material while the ring 744 and filter material 742 are made of a second material. In yet other instances, the cylindrical body 710, the ring 744 and the filter material 742 can all be made of different materials. The materials from which the cylindrical body 710, the ring 744 and the filter material 742 can be made as described with regard to the cylindrical body 110, the ring 142 and the filter material 144.

Figure 8:
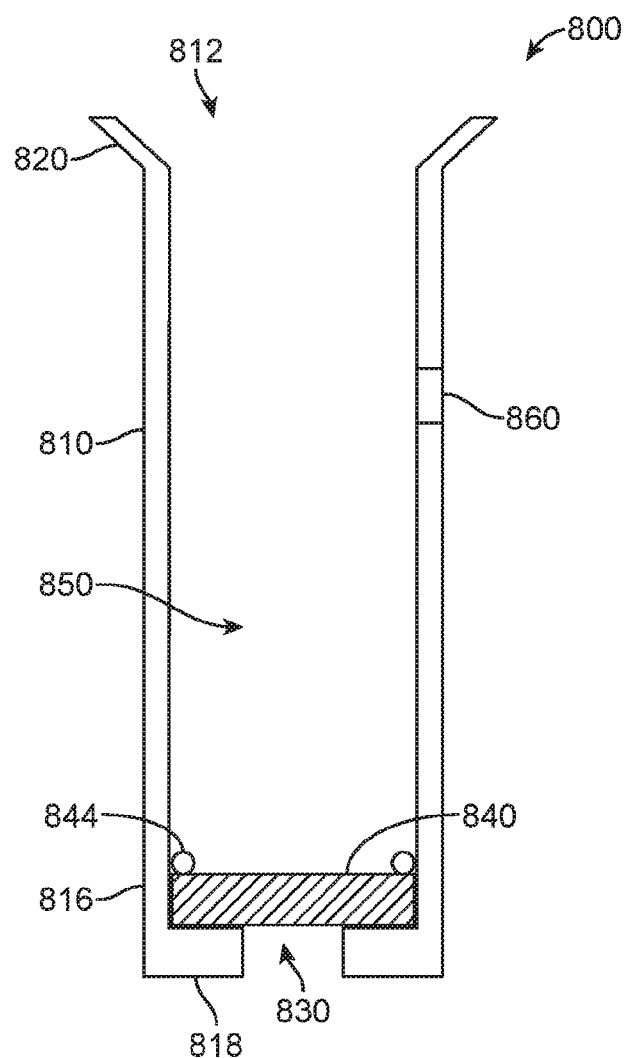
FIG. 8 is a cross-sectional view of yet another filter insert in accordance with various embodiments of the present disclosure.

FIG. 8 is a cross-sectional view of yet another sample vial filter insert in accordance with various embodiments of the present disclosure. The filter insert 800 includes a cylindrical body 810 and a filter material 840. The cylindrical body 810 includes a proximal open end 812, a distal end 816, a protrusion or tapered lip 820 extending radially from the proximal end 812 of the cylindrical body 810. The lip 820 is configured to set on an open end of a sample vial. A cavity 850 extends longitudinally through the cylindrical body 810, from the proximal end 812 to the distal end 816. A throughput 860 allows for fluid communication between the cavity 850 and the environment external to the filter insert 800. The distal end 816 includes a filter support 818 which extends perpendicularly from the cylindrical body 810 toward the center of the cavity 850. A throughput 830 in the filter support 818 allows for passage of a sample-containing solution through the distal end 816, to the filter material 840 and into the cavity 850. The filter material 840 has a diameter the same as, or substantially the same as the diameter of the cavity 850 and can be inserted into the cylindrical body 810 through the proximal end 812 to rest on the filter support 818. The filter material 840 can be further secured on the filter support 818 with an O-ring 844 or similar means of securement.

In some instances, the cylindrical body 810, the filter material 840 and the O-ring 844 can be made of the same material. In other instances, the cylindrical body 810 and the O-ring 844 can be made of the same material while the filter material 840 is made of a different material. In other instances, the cylindrical body 810 can be a made of a first material while the O-ring 844 and filter material 840 are made of a second material. In yet other instances, the cylindrical body 810, the filter material 840 and the O-ring 844 can all be made of different materials. The materials from which the cylindrical body 810, the filter material 840 and the O-ring 844 can be made as described with regard to the cylindrical body 110 and the filter material 144.

Figure 9:
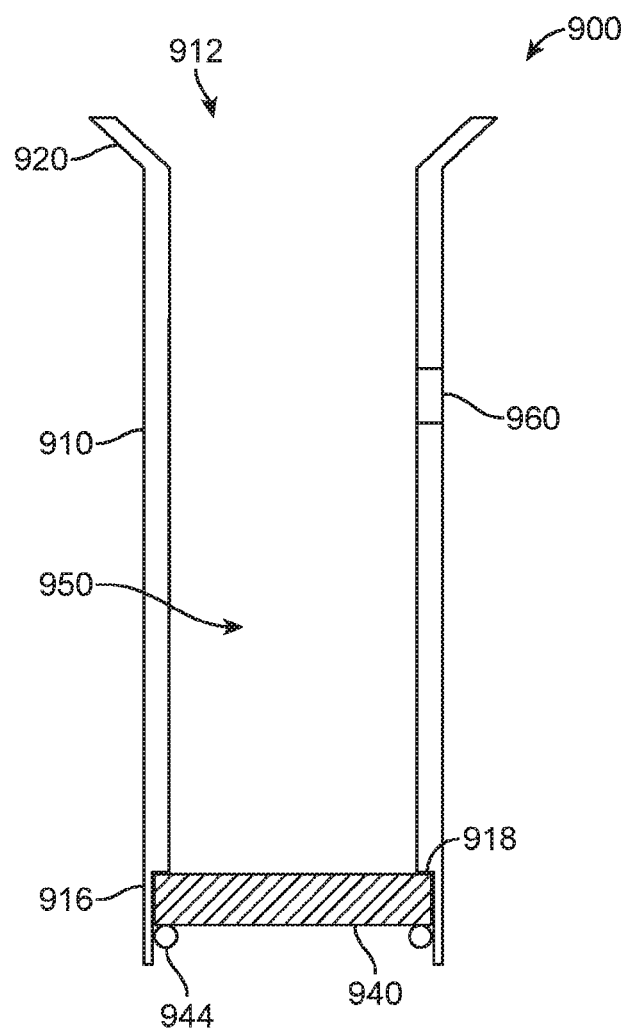
FIG. 9 is a cross-sectional view of yet another filter insert in accordance with various embodiments of the present disclosure.

FIG. 9 is a cross-sectional view of yet another sample vial filter insert in accordance with various embodiments of the present disclosure. The filter insert 900 includes a cylindrical body 910 and a filter material 940. The cylindrical body 910 includes a proximal open end 912, a distal end 916, a protrusion or tapered lip 920 extending radially from the proximal end 912 of the cylindrical body 910. The lip 920 is configured to set on an open end of a sample vial. A cavity 950 extends longitudinally through the cylindrical body 910, from the proximal end 912 to the distal end 916. A throughput 960 allows for fluid communication between the cavity 950 and the environment external to the filter insert 900. The distal end 916 includes a recess 918. The filter material 940 has a diameter the same as, or substantially the same as the diameter of the recess 918 and can be inserted into the recess 918 through the distal end 916 to abut the recess 918. The filter material 940 can be further secured on the recess 918 with an O-ring 944 or similar means of securement. A longitudinal dimension, or height, of the recess 918 can be greater than or equal to a combined longitudinal dimension, or height of the filter material 940 and the O-ring 944.

In some instances, the cylindrical body 910, the filter material 940 and the O-ring 944 can be made of the same material. In other instances, the cylindrical body 910 and the O-ring 944 can be made of the same material while the filter material 940 is made of a different material. In other instances, the cylindrical body 910 can be a made of a first material while the O-ring 944 and the filter material 940 are made of a second material. In yet other instances, the cylindrical body 910, the filter material 940 and the O-ring 944 can all be made of different materials. The materials from which the cylindrical body 910, the filter material 940 and the O-ring 944 can be made as described with regard to the cylindrical body 110 and the filter material 144.

Figure 10:
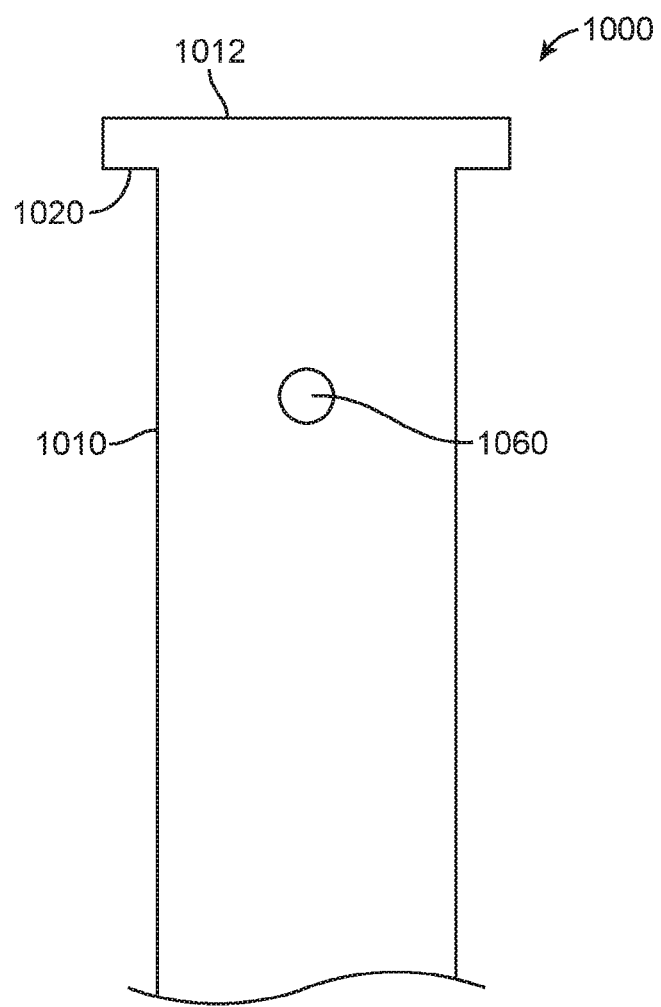
FIG. 10 is a partial side plan view of yet another filter insert in accordance with various embodiments of the present disclosure.

FIG. 10 is a partial side plan view of yet another sample vial filter insert in accordance with various embodiments of the present disclosure. The sample vial filter insert 1000 includes a cylindrical body 1010 and a filter assembly (not shown). The cylindrical body 1010 includes a proximal open end 1012, a distal end (not shown), a non-tapered lip 1020 extending radially from the proximal end 1012 of the cylindrical body 1010. The lip 920 is configured to set on a flat portion of an open end of a sample vial. A cavity (not shown) extends longitudinally through the cylindrical body 1010, from the proximal end 1012 to the distal end. A throughput 1060 allows for fluid communication between the cavity and the environment external to the filter insert 1000. The distal end and the filter assembly can be the same as, or substantially similar to, any of the same illustrated in FIGS. 1-9 of the present disclosure.

While FIGS. 1-9 of the present disclosure illustrate filter inserts with tapered lips and the filter insert 1020 of FIG. 10 is a non-tapered tip, one of ordinary skill in the art can readily appreciate that various shapes of filter insert lips can be used which can effectively rest on a corresponding sample vial. Therefore the shape of a lip for a filter insert in accordance with the present disclosure is not particular limited to tapered and non-tapered configurations.

Figure 11:
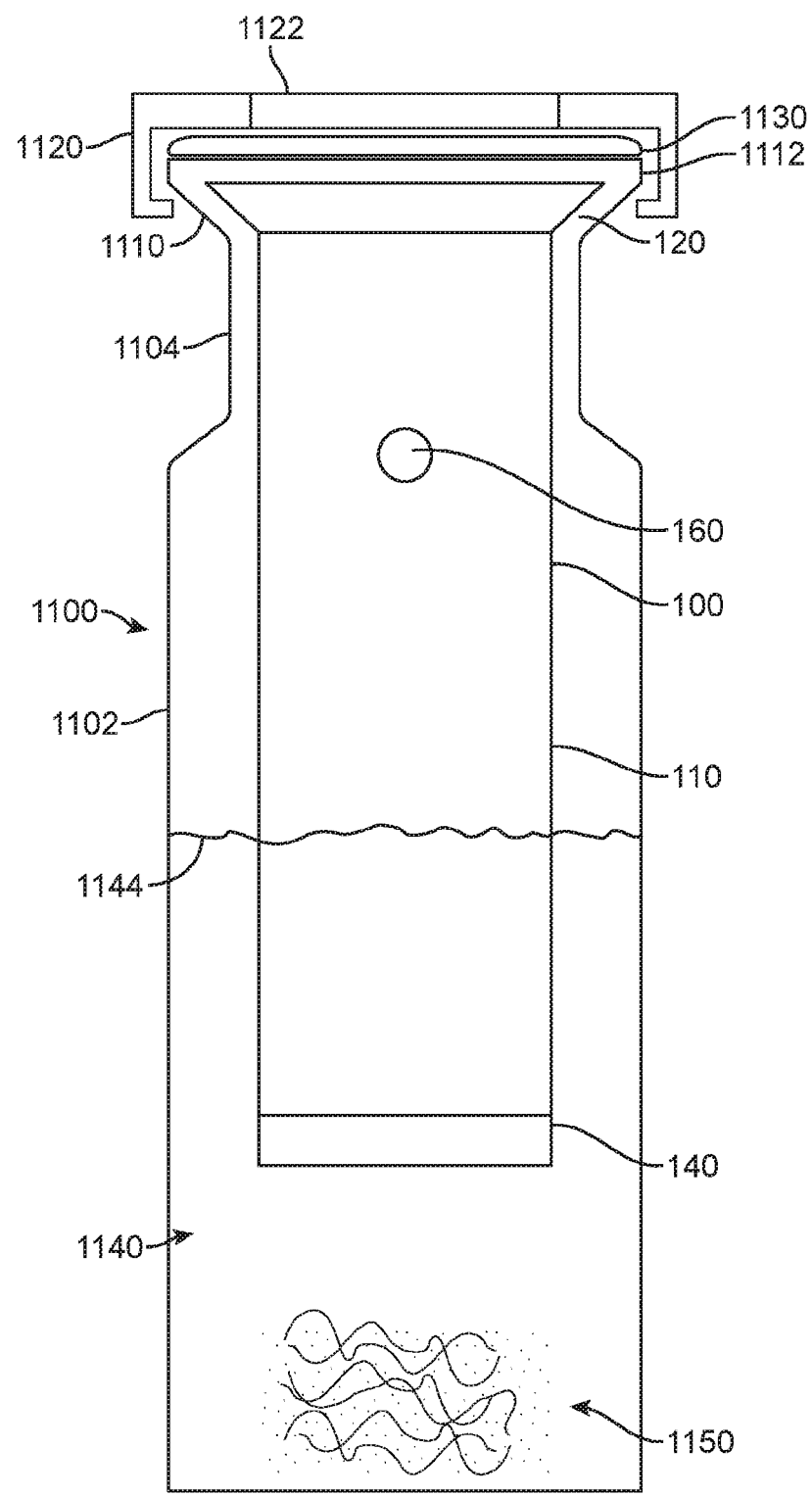
FIG. 11 is an illustration of the filter insert of FIG. 1 in a sample vial in accordance with various embodiments of the present disclosure.

FIG. 11 is an illustration of the sample vial filter insert of FIG. 1 in a sample vial in accordance with various embodiments of the present disclosure. In FIG. 11, the filter insert 100 is placed in a sample vial 1100. The sample vial 1100 includes a main body 1102, a bottleneck 1104, an outwardly tapered portion 1110 and an open top surface 1112. The cylindrical body 110 of the filter insert 100 has an outer diameter which is smaller than the inner diameter of the bottleneck 1104. The lip 120 of the filter insert 100 has outer dimensions which are approximately equal to inner dimensions of the outwardly tapered portion 1110 such that the lip 120 will evenly rest upon the outwardly tapered portion 1110. The height of the filter insert 100 can range from about 40% to about 95% of the height of the sample vial 1100, alternatively the height of the filter insert 100 can range from about 50% to about 90% of the height of the sample vial 1100, alternatively the height of the filter insert 100 can range from about 60% to about 85% of the height of the sample vial 1100, alternatively the height of the filter insert 100 can range from about 70% to about 80% of the height of the sample vial 1100, and alternatively the height of the filter insert 100 can range from about 75% to about 80% of the height of the sample vial 1100. A seal or cap 1120 having a throughput 1122, and a puncturable member 1130, such as a butyl rubber septum, seals the sample vial 1100 and contents therein. The cap 1120 can be sealed onto the sample vial by, for example, crimping. Prior to placement of the filter insert 100 and sealing the sample vial 1100 with the cap 1120 and puncturable member 1130, a solvent 1140 and solid sample 1150 can be placed in the sample vial 1100. The solvent 1140 has a solvent line 1144. In use, the solvent line 1144 should be below the throughput 160 of the filter insert 100. Also, in use, the filter assembly 140 of the filter insert 100 should be spaced sufficiently apart from the bottom of the sample vial such that the solid sample 1150 is not in direct contact with the filer assembly 140.

The solid sample 1150 is not particularly limited. In some instances, the solid sample 1150 can comprise an organic compound of interest such as, for example, a polymer, a small-molecule pharmaceutical compound, an organic fluorophore, an explosive (such as, for example, trinitrotoluene), a narcotic, fats, waxes, sterols, fat-soluble vitamins (such as vitamins A, D, E, and K), mono-, di- or triglycerides, phospholipids, and so on. In some instances, the solid sample 1150 can comprise an inorganic or organometallic compound of interest such as, for example, an organometallic catalyst, an inorganic phosphor or fluorophore, a metal salt (such as for example magnesium of calcium carbonate), a compound having a mixture of metal cations with different charges, a metal complexed to one or more of monodentate, bidentate, tridentate, etc. ligands, and so on. In some instances the solid sample 1150 can comprise an biological compound or composition of interest, such as for example, blood serum, RNA and/or DNA, a virus, bacteria, antibodies, antigens, proteins, nucleic acids, enzymes, and so on.

While in FIG. 11, filter insert 100 is used, any one of the filter inserts illustrated in FIGS. 3-10 can also be considered with regard to the description of FIG. 11. Furthermore, in FIG. 11 the outwardly tapered portion 1110 and the open top surface 1112 of the sample vial 1100 have smooth outer surfaces and are sealed with a crimp-type cap 1120. In other instances, a sample vial can be used in which a main body, with or without a bottleneck portion, and an open proximal end having male threads which can engage a female-threaded cap. One of ordinary skill in the art will further recognize that crimp-type caps and female threaded caps are two of many different types of sample vial caps that can be used and other types of caps can be used without imparting from the subject matter of the present disclosure.

Figure 12:
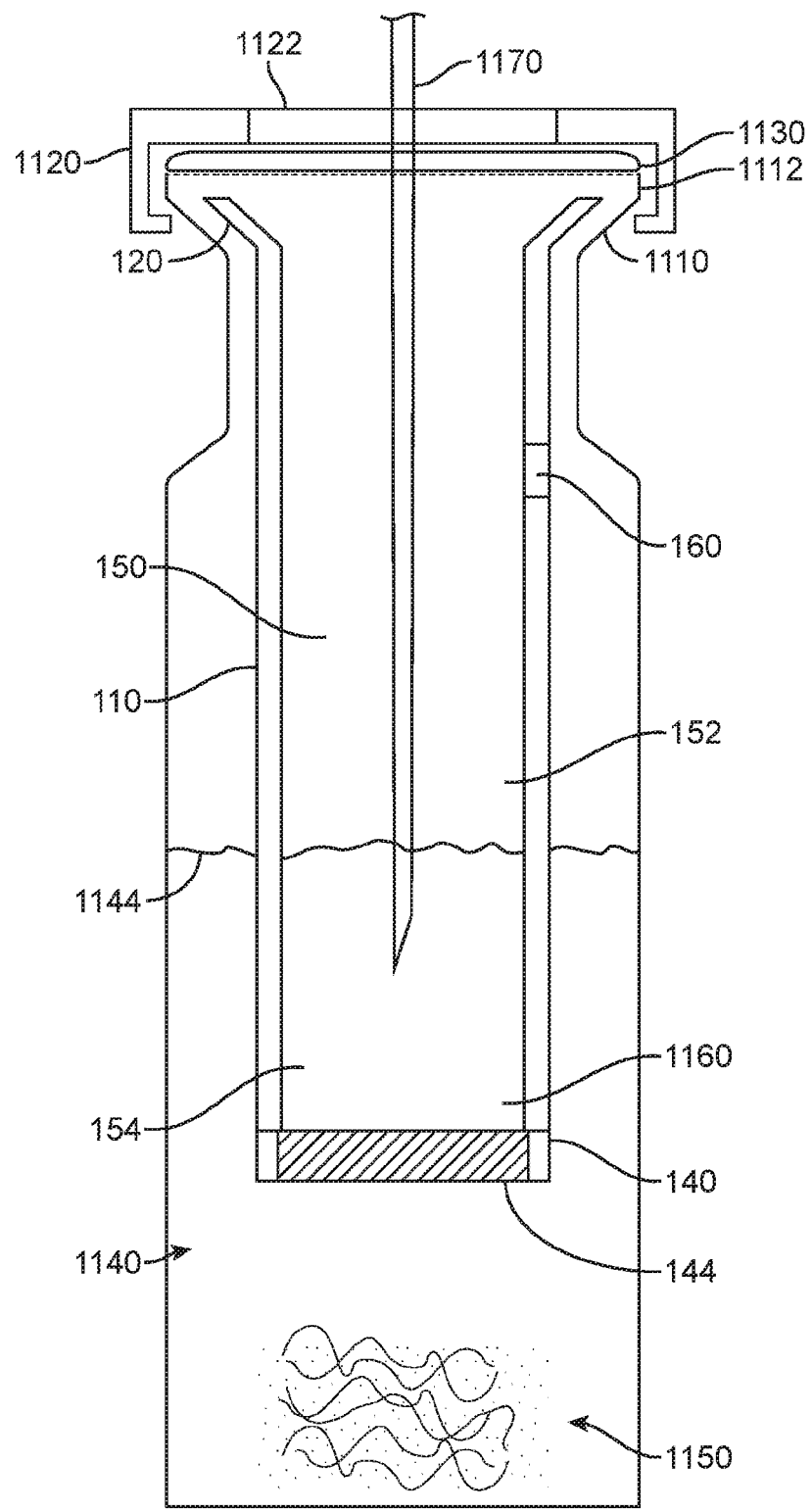
FIG. 12 is an illustration of a cross-sectional view of the filter insert of FIG. 1 in a sample vial having an extraction member placed into the cavity of the filer insert in accordance with various embodiments of the present disclosure.

FIG. 12 is an illustration showing a cross-sectional view of the sample vial filter insert of FIG. 1 in a sample vial having an extraction member placed into the cavity of the filer insert in accordance with various embodiments of the present disclosure. As previously described, the filter insert 100 includes the cylindrical body 110 and the filter assembly 140. The cylindrical body 110 includes the proximal open end 112, the distal end 116, the protrusion or tapered lip 120 extending radially from the proximal end 112 of the cylindrical body 110. The lip 120 of the filter insert 100 has outer dimensions which are approximately equal to inner dimensions of the outwardly tapered portion 1110 such that the lip 120 will evenly rest upon the outwardly tapered portion 1110. The filter assembly 140 is coupled with the distal end 116 of the cylindrical body 110. The cavity 150 extends longitudinally through the cylindrical body 110, from the proximal end 112 to the distal end 116. The filter assembly 140 includes the filter material 144. In use, the sample vial 1100 can have a solvent 1140 and a solid sample 1150 therein. The solvent 1140 has a solvent line 1144. The throughput 160 allows for fluid communication between the cavity 150 and the interior of the sample vial 1100. Specifically, the throughput 160 allows for a pressure equilibrium between the cavity 150 and the interior of the sample vial 1100 such that the solvent line 1144 can be at the same point inside and outside of the cavity 150 and the gases above the solvent line 1144 inside the cavity 150 and above the solvent line 1144 in the sample vial 1100 can freely move therebetween. Therefore, in the cavity 150, the solvent line 1144 can separate a gaseous phase 152 from a liquid phase 154. As the solid sample 1150 dissolves in, or is solubilized by, the solvent 1140, a sample-containing solution 1160 can be formed which can traverse the filter material 144 and enter the liquid phase 154 of the cavity 150. An extraction member 1170 such as, for example, a syringe can be made to traverse the throughput 1122 of the cap 1120 and the puncturable member 1130 to enter the cavity 150 of the filter insert 100. The extraction member 1170 can be made to enter the liquid phase 154 and extract at an aliquot containing the sample-containing solution 1160 for analysis by an analytical device.

The analytical device is not particularly limited. Specifically, any analytical device that can determine the composition of a fluid or solution can be used. The analytical device can be for example, gas chromatography (GC), gas chromatography-mass spectrometry (GC-MS), electrospray ionization gas chromatograph (ESI-GC), gas chromatography-IR spectroscopy (GC-IR), liquid chromatography-mass spectrometry (LC-MS), high performance liquid chromatography (HPLC), gel permeation chromatography (GPC), gel permeation chromatography-IR spectroscopy (GPC-IR) ultraviolet-visible (UV-Vis) spectroscopy, fluorescence spectroscopy, phosphorescence spectroscopy, electrophoresis, capillary electrophoresis (CE), flow cytometry, inductively coupled plasma-mass spectrometry (ICP-MS), inductively coupled plasma-optical emission spectrometry (ICP-OES), electrolysis, cyclic voltammetry (CV), atomic absorption spectroscopy (AAS), atomic emission spectroscopy (AES), flame atomic absorption spectroscopy (FLAA), polymerase chain reaction (PCR), or any other suitable analytical device.

While in FIG. 12, filter insert 100 is illustrated, any one of the filter inserts illustrated in FIGS. 3-10 can also be considered with regard to the description below of FIG. 12.

Figure 13:
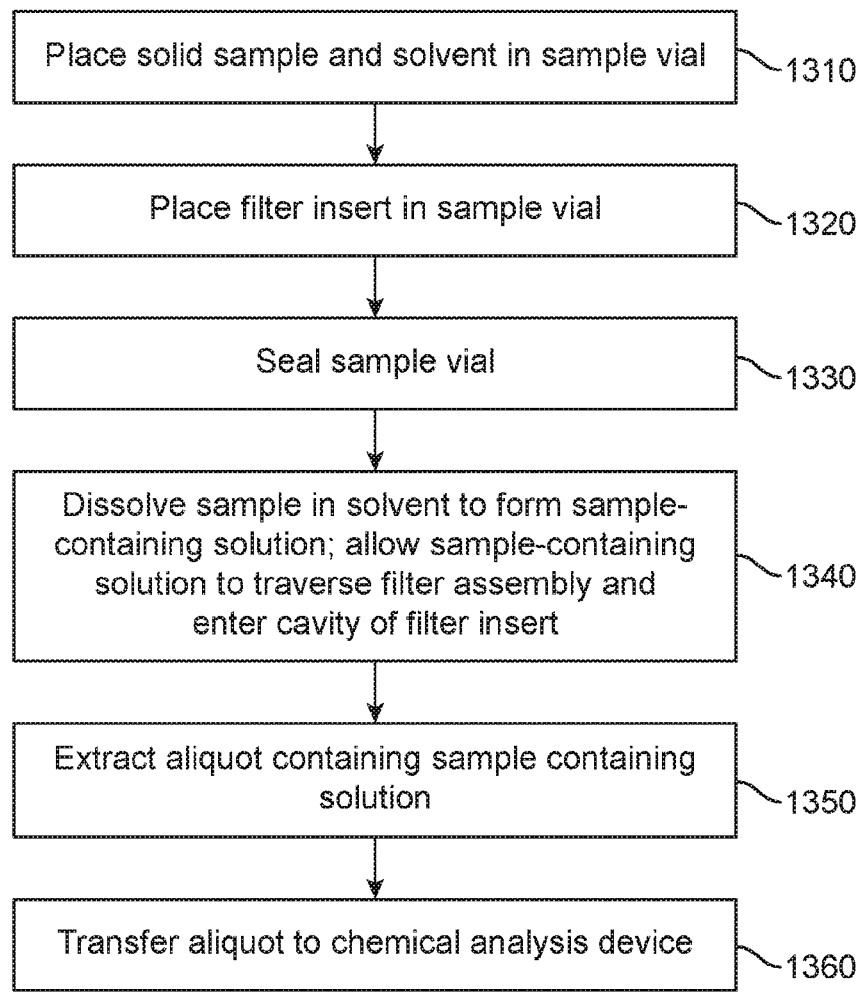
FIG. 13 is a diagram of a method for using a filter insert for chemical analysis in accordance with various embodiments of the present disclosure.

FIG. 13 is a diagram of a method for using a filter insert for chemical analysis in accordance with various embodiments of the present disclosure. In block 1310, a solid sample and a solvent is placed in a sample vial. In block 1320, a filter insert, such as a filter insert as illustrated and described in any one FIGS. 1-10, is placed in the sample vial. In block 1330, the sample vial sealed with a cap, lid or any other suitable sealing member, that has a throughput and a puncturable member as described above in FIGS. 11-12. In block 1340, the solid sample is dissolved or solubilized in the solvent to form a sample-containing solution, and the sample-containing-solution is allowed to traverse a filter assembly and enter a cavity of the filter insert. In block 1350, an aliquot of the sample-containing solution is extracted from the filter insert cavity using an extraction member, such as a syringe. In block 1360, the aliquot is transferred, using the extraction member, to a chemical analysis device. The aliquot can be transferred manually by a user or via an automated device.

In some instances, a magnetic stir bar can also be added in block 1310. In some instances, block 1340 can further include stirring the solid sample and solvent to aid in dissolution of the solid sample to form the sample-containing solution. In such instances, the sample vial can be placed on, or in the vicinity of, an apparatus which can act upon the magnetic stir bar, causing the magnetic stir bar to move. In some instances, block 1340 can further include agitating, vibrating and sonicating the solid sample and solvent to aid in dissolution of the solid sample to form the sample-containing solution. In such instances, the sample vial can be placed on, or in the vicinity of, an agitating, vibrating or sonicating apparatus. In some instances, block 1340 can further include heating the solid sample and solvent to aid in dissolution of the solid sample to form the sample-containing solution. In such instances, the sample vial can be placed on, or in the vicinity of, a heating element.

Any one of the filter inserts described herein can be provided as part of a kit. The kit can include a sample vial, a cap or lid including a puncturable member such as a septum, and a filter insert. The kit can further include a stir bar. When the kit includes a filter insert as described in any one of FIGS. 5-10, more than one filter assembly or filter material can be provided in the kit wherein each of the filter assemblies/materials have a different property. For example, a kit can provide three filter assemblies/materials wherein the first has pores with diameters ranging from about 5 nm to 500 nm, the second has pores ranging from about 500 nm to 5 µm, and the third has pores ranging from 5 µm to 100 µm. Also, for example, a kit can provide three filter assemblies/materials wherein each has pores of approximately the same diameter or range of diameters, but where the first comprises a hydrophobic material, the second comprises a hydrophilic material, and the third comprises a material having hydrophobic domains and hydrophilic domains. The kit can further provide a manual or instructions for using the filter insert and other components of the kit. In other kits, multiple filter inserts can be provided where each have the same or substantially the same dimensions, but wherein each filter insert is made of a different material for use in different conditions, such as for compatibility with different solvents or solvent systems, temperatures, etc. The sample vials can be screw-top vials which mate with a corresponding threaded cap, vials which can be used with crimping caps, or any other suitable sample vial and corresponding cap or lid and puncturable member.

Statements of the Disclosure include:

Statement 1: A sample vial assembly, the assembly comprising a sample vial having a proximal open end and a distal closed end; a filter insert, the insert comprising a cylindrical body comprising a proximal end, a protrusion extending radially from the proximal end of the cylindrical body and configured to set on the open end of the sample vial, a distal end, and a cavity extending longitudinally through the cylindrical body from the proximal end to the distal end; and a filter assembly coupled with the distal end of the cylindrical body; and a seal configured to couple with the proximal open end of the sample vial and allow for passage of a sample extraction member through the seal and into the cavity of the cylindrical body.

Statement 2: An assembly according to Statement 1, wherein the distal end of the filter insert and the filter assembly are threadedly coupled.

Statement 3: An assembly according to Statement 1, wherein the distal end of the filter insert and the filter assembly are snap-fit coupled.

Statement 4: An assembly according to Statement 1, wherein the distal end of the filter insert and the filter assembly are fused or adhered to each other.

Statement 5: An assembly according to any one of Statements 1-4, wherein the filter assembly comprises a woven mesh filter material.

Statement 6: An assembly according to any one of Statements 1-5, wherein the filter assembly comprises a porous filter material.

Statement 7: An assembly according to any one of Statements 1-6, wherein the filter assembly comprises a hydrophobic filter material.

Statement 8: An assembly according to any one of Statements 1-7, wherein the filter assembly comprises a hydrophilic filter material.

Statement 9: An assembly according to any one of Statements 1-8, wherein the filter insert cylindrical body further comprises a throughput for fluid communication between the cavity and the interior of the sample vial.

Statement 10: An assembly according to any one of Statements 1-9, wherein the filter insert cylindrical body and the filter assembly are made of the same material.

Statement 11: An assembly according to any one of Statements 1-9, wherein the filter insert cylindrical body and the filter assembly are made of different materials.

Statement 12: An assembly according to any one of Statements 1-11, wherein the one or both of the filter insert cylindrical body and the filter assembly consist essentially of a polymeric material.

Statement 13: An assembly according to Statement 12, wherein the polymeric material is a fluorinated polymeric material.

Statement 14: An assembly according to Statement 13, wherein the fluorinated polymeric material is any one a polytetrafluoroethylene, a polychlorotrifluoroethylene, a polyethylenechlorotrifluoroethylene, a polyvinylfluoride, a polyvinylidene fluoride, a perfluoroalkoxy polymer, a fluorinated ethylene-propylene polymer, a polyethylenetetrafluoroethylene, a perfluorinated elastomer, a fluoroelastomer, a perfluoropolyether, and a perfluorosulfonic acid polymer.

Statement 15: An assembly according to Statement 14, wherein the fluorinated polymeric material is a polytetrafluoroethylene.

Statement 16: An assembly according to Statement 12, wherein the polymeric material is any one of a poly(alkylene oxide), a poly(ethylene terephthalate), a polyamine, a polyamide, a polyimide, a poly(alkylacrylamide), a polycarbonate, a polyacrylate, a poly(methyl methacrylate), a polyvinyl alcohol, a polyvinyl acetate, a polyvinyl chloride, a high-density polyalkylene, a low-density polyalkylene, a polyaramid, a polyacrylonitrile, an aromatic polyester, a polyketone, a polyaryl ether ketone (PAEK), a polyether ether ketone (PEEK), a polyether ketone (PEKK), a polyaromatic, a polysulfone, and a polyetherimide.

Statement 17: A filter insert for use in a sample vial, the insert comprising a cylindrical body comprising a proximal end, a protrusion extending radially from the proximal end of the cylindrical body and configured to set on the open end of the sample vial, a distal end, and a cavity extending longitudinally through the cylindrical body from the proximal end to the distal end; and a filter assembly coupled with the distal end of the cylindrical body.

Statement 18: A filter insert according to Statement 17, wherein the distal end and the filter assembly are threadedly coupled.

Statement 19: A filter insert according to Statement 17, wherein the distal end and the filter assembly are snap-fit coupled.

Statement 20: A filter insert according to Statement 17, wherein the distal end and the filter assembly are fused or adhered to each other.

Statement 21: A filter insert according to any one of Statements 17-20, wherein the filter assembly comprises a woven mesh filter material.

Statement 22: A filter insert according to any one of Statements 17-21, wherein the filter assembly comprises a porous filter material.

Statement 23: A filter insert according to any one of Statements 17-22, wherein the filter assembly comprises a hydrophobic filter material.

Statement 24: A filter insert according to any one of Statements 17-23, wherein the filter assembly comprises a hydrophilic filter material.

Statement 25: A filter insert according to any one of Statements 17-24, wherein the cylindrical body further comprises a throughput for fluid communication between the cavity and the environment surrounding the filter insert.

Statement 26: A filter insert according to any one of Statements 17-25, wherein the cylindrical body and the filter assembly are made of the same material.

Statement 27: A filter insert according to any one of Statements 17-25, wherein the cylindrical body and the filter assembly are made of different materials.

Statement 28: A filter insert according to any one of Statements 17-27, wherein the one or both of the cylindrical body and the filter assembly consist essentially of a polymeric material.

Statement 29: A filter insert according to Statement 28, wherein the polymeric material is a fluorinated polymeric material.

Statement 30: A filter insert according to Statement 29, wherein the fluorinated polymeric material is any one a polytetrafluoroethylene, a polychlorotrifluoroethylene, a polyethylenechlorotrifluoroethylene, a polyvinylfluoride, polyvinylidene fluoride, a perfluoroalkoxy polymer, a fluorinated ethylene-propylene polymer, a polyethylenetetrafluoroethylene, a perfluorinated elastomer, a fluoroelastomer, a fluorocarbon polymer, a perfluoropolyether, and a perfluorosulfonic acid polymer.

Statement 31: A filter insert according to Statement 30, wherein the fluorinated polymeric material is a polytetrafluoroethylene.

Statement 32: A filter insert according to Statement 29, wherein the polymeric material is any one of a poly(alkylene oxide), a poly(ethylene terephthalate), a polyamine, a polyamide, a polyimide, a polycarbonate, a polyacrylate, a poly(methyl methacrylate), a polyvinyl alcohol, a polyvinyl acetate, a polyvinyl chloride, a high-density polyalkylene, a low-density polyalkylene, a poly-aramid, a polyacrylonitrile, an aromatic polyester, a polyketone, a polyaryl ether ketone (PAEK), a polyether ether ketone (PEEK), a polyether ketone (PEKK), a polyaromatic, a polysulfone, and a polyetherimide.

Statement 33: A method for analyzing a solid sample, the method comprising placing a solid sample and a solvent in a sample vial; placing a filter insert in the sample vial, the filter insert comprising: a cylindrical body comprising a proximal end, a protrusion extending radially from the proximal end of the cylindrical body and configured to set on the open end of the sample vial, a distal end, and a cavity extending longitudinally through the cylindrical body from the proximal end to the distal end; and a filter assembly coupled with the distal end of the cylindrical body; sealing the sample vial with a seal, the seal configured to allow for passage of a sample extraction member through the seal and into the cavity of the cylindrical body; dissolving the solid sample in the solvent to form a sample-containing solution and allowing the sample-containing solution to traverse the filter assembly into the cylindrical body cavity; extracting an aliquot containing the sample-containing solution from the cylindrical body cavity; and transferring the aliquot to a chemical analysis device.

Statement 34: A method according to Statement 33, wherein dissolving the solid sample in the solvent further comprises stirring the solid sample and the solvent.

Statement 35: A method according to Statement 33 or Statement 34, wherein dissolving the solid sample in the solvent further comprises anyone of agitating, vibrating and sonicating the solid sample and the solvent.

Statement 36: A method according to any one Statements 33-35, wherein dissolving the solid sample in the solvent further comprises further comprises heating the solid sample and solvent.

Statement 37: A method according to any one Statements 33-36, wherein the solid sample comprises an organic composition.

Statement 38: A method according to any one Statements 33-37, wherein the sample comprises an inorganic composition.

Statement 39: A method according to any one Statements 33-38, wherein the sample comprises an organometallic composition.

Statement 40: A method according to any one Statements 33-39, wherein the sample comprises a biological composition.

Statement 41: A sample vial kit, the kit comprising a sample vial; a filter insert configured to be placed in the sample vial, the insert comprising a cylindrical body comprising: a proximal end, a protrusion extending radially from the proximal end of the cylindrical body and configured to set on a proximal open end of the sample vial, a distal end, and a cavity extending longitudinally through the cylindrical body from the proximal end to the distal end; and a filter assembly coupled to or couplable with the distal end of the cylindrical body; and a sample vial sealing member configured to couple with the sample vial and allow for passage of a sample extraction member through the sealing member and into the cavity of the cylindrical body.

Statement 42: A kit according to Statement 41, further comprising a magnetic stir bar.

Statement 43: A kit according to Statement 41 or Statement 42, further comprising one or more additional filter assemblies.

Statement 44: A kit according to Statement 43, wherein each of the filter assembly and the one or more additional filter assemblies comprise a different filter material.

Statement 45: A kit according to Statement 44, wherein each different filter material comprises pores of a predetermined diameter or range of diameters.

Statement 46: A kit according to Statement 44 or Statement 45, wherein the different filter materials comprise one or more of a hydrophobic filter material and a hydrophilic filter material.

Statement 47: A kit according to any one of Statements 41-46, wherein the sealing member comprises a septum and a crimp-top cap.

Statement 48: A kit according to any one of Statements 41-47, wherein the proximal open end of the sample vial further comprises a male-threaded portion for coupling with the sealing member.

Statement 49: A kit according to Statements 48, wherein the sample vial sealing member comprises a septum and a female-threaded portion for coupling with the male-threaded portion of the sample vial.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A sample vial assembly, the assembly comprising: a sample vial having a proximal open end and a distal closed end; a filter insert, the insert comprising: a cylindrical body having: a proximal end; a protrusion extending radially from the proximal end of the cylindrical body and configured to set on the open end of the sample vial; a distal end; a cavity extending longitudinally through the cylindrical body from the proximal end to the distal end; and a filter assembly coupled with the distal end of the cylindrical body; and a seal configured to couple with the proximal open end of the sample vial and allow for passage of a sample extraction member through the seal and into the cavity of the cylindrical body, wherein the filter insert is fully inserted in the sample vial with the protrusion of the filter insert set on the proximal open end of the sample vial, and the height of the filter insert is 40% to 95% the height of the sample vial such that the filter insert does not touch the distal closed end of the sample vial.

2. The assembly of claim 1, wherein the distal end of the filter insert and the filter assembly are threadedly coupled.

3. The assembly of claim 1, wherein the distal end of the filter insert and the filter assembly are snap-fit coupled.

4. The assembly of claim 1, wherein the distal end of the filter insert and the filter assembly are fused or adhered to each other.

5. The assembly of claim 1, wherein the filter assembly comprises a woven mesh filter material.

6. The assembly of claim 1, wherein the filter assembly comprises a porous filter material.

7. The assembly of claim 1, wherein the filter assembly comprises a hydrophobic filter material or a hydrophilic filter material.

8. The assembly of claim 1, wherein the filter insert cylindrical body further comprises a throughput for fluid communication between the cavity and the interior of the sample vial.

9. The assembly of claim 1, wherein the filter insert cylindrical body and the filter assembly are made of the same material.

10. The assembly of claim 1, wherein one or both of the filter insert cylindrical body and the filter assembly consist essentially of a polymeric material,
wherein the polymeric material is any one of a poly(alkylene oxide), a poly(ethylene terephthalate), a polyamine, a polyamide, a polyimide, a polycarbonate, a polyacrylate, a poly(methyl methacrylate), a polyvinyl alcohol, a polyvinyl acetate, a polyvinyl chloride, a high-density polyalkylene, a low-density polyalkylene, a poly-aramid, a polyacrylonitrile, an aromatic polyester, a polyketone, a polyaryl ether ketone (PAEK), a polyether ether ketone (PEEK), a polyether ketone ketone (PEKK), a polyaromatic, a polysulfone, and a polyetherimide.

11. The sample vial assembly of claim 1, wherein the height of the filter insert is 50% to 90% the height of the sample vial.

12. The sample vial assembly of claim 1, wherein the height of the filter insert is 60% to 85% the height of the sample vial.

13. The assembly of claim 1, wherein the one or both of the filter insert cylindrical body and the filter assembly consist essentially of a polymeric material, wherein the polymeric material is a fluorinated polymeric material, the fluorinated polymeric material being any one a polytetrafluoroethylene, a polychlorotrifluoroethylene, a poly ethylenechlorotrifluoroethylene, a polyvinylfluoride, a polyvinylidene fluoride, a perfluoroalkoxy polymer, a fluorinated ethylene-propylene polymer, a polyethylenetetrafluoroethylene, a perfluorinated elastomer, a fluoroelastomer, a fluorocarbon polymer, a perfluoropolyether, and a perfluorosulfonic acid polymer.

14. A sample vial assembly, the assembly comprising: a sample vial having a proximal open end and a distal closed end; a filter insert, the insert consisting of: a cylindrical body having: a proximal end; a protrusion extending radially from the proximal end of the cylindrical body and configured to set on the open end of the sample vial; a distal end; a cavity extending longitudinally through the cylindrical body from the proximal end to the distal end; and a throughput, located between the proximal end and the distal end, for fluid communication between the cavity and the interior of the sample vial; and a filter assembly coupled with the distal end of the cylindrical body; and a seal configured to couple with the proximal open end of the sample vial and allow for passage of a sample extraction member through the seal and into the cavity of the cylindrical body, wherein the protrusion of the filter insert is set on the proximal open end of the sample vial such that the height of the filter insert is 40% to 95% the height of the sample vial such that the filter insert does not touch the distal closed end of the sample vial.

15. The assembly of claim 1, wherein the distal end of the filter insert and the filter assembly are threadedly coupled or snap-fit coupled.

16. The assembly of claim 1, wherein the filter assembly comprises a porous filter material.

17. The assembly of claim 1, wherein the filter assembly comprises a hydrophobic filter material or a hydrophilic filter material.

18. The assembly of claim 1, wherein the filter insert cylindrical body and the filter assembly are made of the same material.

19. The assembly of claim 1, wherein one or both of the filter insert cylindrical body and the filter assembly consist essentially of a polymeric material, wherein the polymeric material is any one of a poly (alkylene oxide), a poly(ethylene terephthalate), a polyamine, a polyamide, a polyimide, a polycarbonate, a polyacrylate, a poly(methyl methacrylate), a polyvinyl alcohol, a polyvinyl acetate, a polyvinyl chloride, a high-density polyalkylene, a low-density polyalkylene, a poly-aramid, a polyacrylonitrile, an aromatic polyester, a polyketone, a polyaryl ether ketone (PAEK), a polyether ether ketone (PEEK), a polyether ketone ketone (PEKK), a polyaromatic, a polysulfone, and a polyetherimide, or wherein the polymeric material is a fluorinated polymeric material, the fluorinated polymeric material being any one a polytetrafluoroethylene, a polychlorotrifluoroethylene, a polyethylenechlorotrifluoroethylene, a polyvinylfluoride, a polyvinylidene fluoride, a perfluoroalkoxy polymer, a fluorinated ethylene-propylene polymer, a polyethylenetetrafluoroethylene, a perfluorinated elastomer, a fluoroelastomer, a fluorocarbon polymer, a perfluoropolyether, and a perfluorosulfonic acid polymer.

20. The sample vial assembly of claim 1, wherein the height of the filter insert is 60% to 85% the height of the sample vial.

* * * * *